(12) United States Patent  
Parish

(10) Patent No.: US 12,345,384 B2
(45) Date of Patent: Jul. 1, 2025

(54) PAVING MACHINE LIGHTING ASSEMBLY

(71) Applicant: Edwin Parish, Wichita, KS (US)

(72) Inventor: Edwin Parish, Wichita, KS (US)

(*) Notice: Subject to any disclaimer, the term of this patent is extended or adjusted under 35 U.S.C. 154(b) by 0 days.

(21) Appl. No.: 18/893,138

(22) Filed: Sep. 23, 2024

(65) Prior Publication Data

US 2025/0012417 A1 Jan. 9, 2025

(51) Int. Cl.
  *F21S 41/19* (2018.01)
  *B60Q 1/24* (2006.01)
  *E01C 19/42* (2006.01)
  *F21V 21/10* (2006.01)
  *F21V 21/26* (2006.01)

(52) U.S. Cl.
  CPC .............. *F21S 41/19* (2018.01); *E01C 19/42* (2013.01); *F21V 21/10* (2013.01); *F21V 21/26* (2013.01); *B60Q 1/24* (2013.01); *E01C 2301/00* (2013.01)

(58) Field of Classification Search
  CPC .......... F21S 41/19; F21V 21/10; F21V 21/26; F21V 21/14; E01C 2301/00; E01C 19/42; B60Q 1/24
  USPC ........................................................ 362/523
  See application file for complete search history.

(56) References Cited

U.S. PATENT DOCUMENTS

| 5,352,063 | A  | * | 10/1994 | Allen .................... | E01C 19/008 404/84.2 |
| 2013/0082161 | A1 | * | 4/2013 | Eul ........................ | B60Q 1/247 362/546 |
| 2021/0262178 | A1 | * | 8/2021 | Eul ......................... | E01C 19/42 |
| 2021/0285168 | A1 | * | 9/2021 | Gundala ............. | E01C 19/4873 |
| 2023/0278500 | A1 | * | 9/2023 | Parish .................... | B60Q 1/307 280/164.1 |
| 2024/0085003 | A1 |   | 3/2024 | Parish |  |

* cited by examiner

*Primary Examiner* — Laura K Tso
(74) *Attorney, Agent, or Firm* — Kenneth H. Jack; Davis & Jack, LLC

(57) ABSTRACT

A paving machine lighting assembly incorporating a mounting plate; a shelf fixedly attached to and cantilevering from the mounting plate; a column fixedly attached to and extending upwardly from the shelf, the column having an upper segment and a lower segment; a swivel joint interconnecting the column's upper and lower segments; a boom arm having a proximal end fixedly attached to an upper end of the column; an electric light fixedly attached to the boom arm's distal end; and a vertical mounting surface at the pavement forming end of the paving machine, the mounting plate being securely bolted to the paving machine's vertical mounting surface.

20 Claims, 9 Drawing Sheets

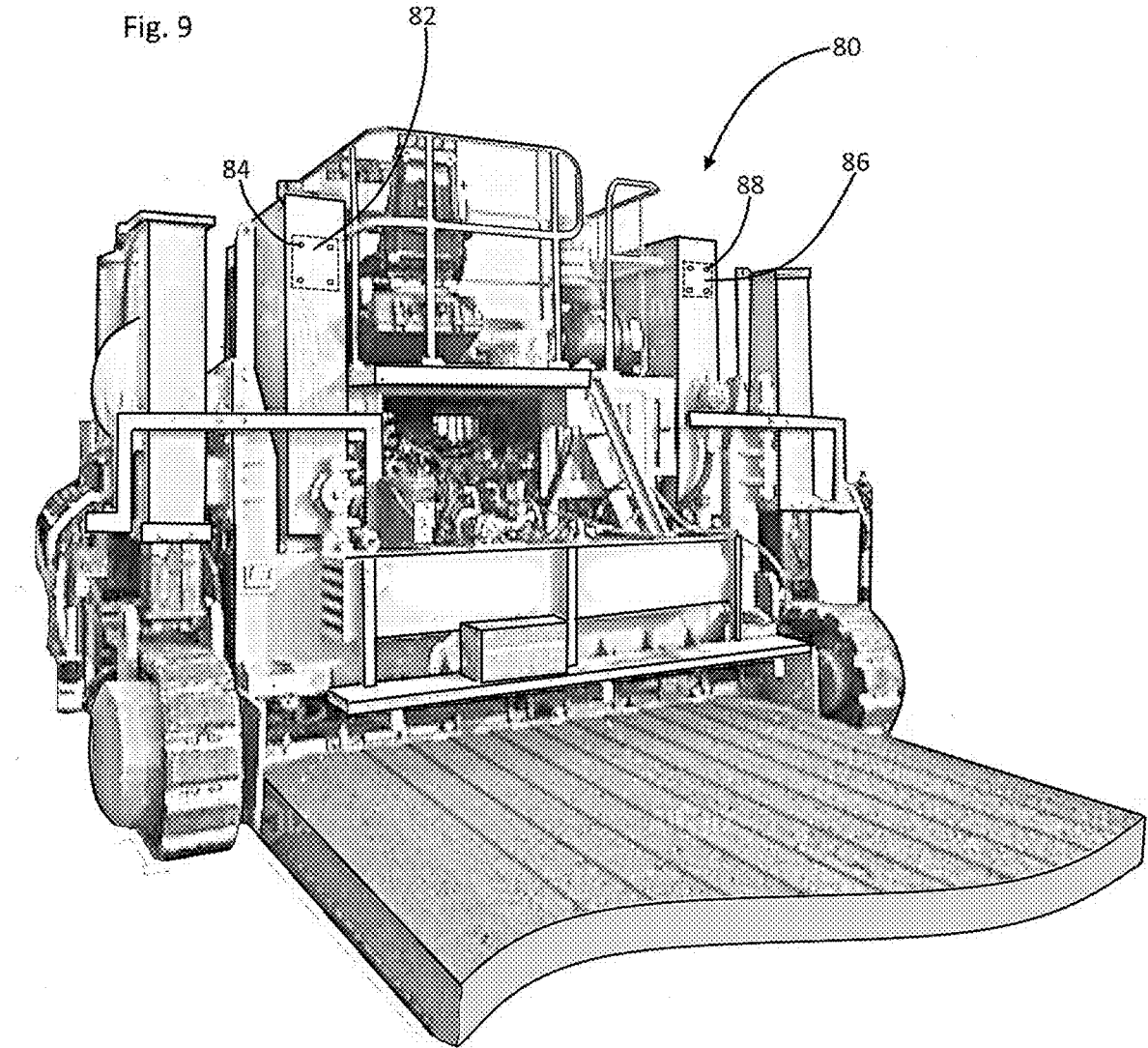

PAVING MACHINE LIGHTING ASSEMBLY

FIELD OF THE INVENTION

This invention relates to road paving machines, including asphalt paving machines and concrete paving machines. More particularly, this invention relates to apparatus and assemblies for illuminating such machines and paving operations performed by such machines.

BACKGROUND OF THE INVENTION

Asphalt paving machines and concrete paving machines are often operated during dark nighttime hours. Known assemblies for illuminating areas at and about such machines are commonly incapable of adequately illuminating desired working areas while paving operations are proceeding.

The instant inventive paving machine lighting assembly solves or ameliorates such problems and deficiencies by providing an adjustably positionable electric light assembly which is conveniently mountable upon available vertical surfaces presented at the paving materials dispensing and forming ends of such paving machines.

BRIEF SUMMARY OF THE INVENTION

A first structural component of the instant inventive paving machine lighting assembly comprises a first mounting plate. In a preferred embodiment, the first mounting plate component is substantially vertically oriented, and is composed of steel. In such preferred embodiment, the first mounting plate is substantially square, having peripheral dimensions of approximately 9"×9".

A further structural component of the instant inventive assembly comprises a shelf or ledge which is fixedly attached to and cantilevers substantially horizontally from the mounting plate. In a preferred embodiment, a proximal end of the shelf is fixedly welded to an upper end of the mounting plate. Triangulating gusset plates preferably span between the shelf and the mounting plate to provide ridged support to the shelf.

A further structural component of the instant inventive assembly comprises a vertical column which is fixedly attached to and extends upwardly from the shelf. In a preferred embodiment, the vertical column is segmented to include or form an upper segment and a lower segment. The column's upper and lower segments are preferably interconnected at their respective lower and upper ends by a swivel joint which facilitates rotation of the vertical column about a vertical axis. Segments of the column may incorporate telescoping pin-and-socket joints at their junctures to facilitate selective vertical height adjustment.

A further structural component of the instant inventive assembly comprises a boom arm having proximal and distal ends, such arm's proximal end being fixedly attached to an upper end of the column's upper segment. An upper gusset plate preferably extends from the boom arm to the column to lend rigidity and structural support to the boom arm.

A further structural component of the instant inventive paving machine lighting assembly comprises an electric light, preferably and LED light, which is fixedly attached to the boom arm's distal end. In a preferred embodiment, the boom arm component incorporates a hollow bore which may function as an electric cable conduit which receives the LED light's power cord.

To assemble the instant invention for illumination of road paving operations, an operator or assembler may initially identify a substantially vertical surface or wall which is situated at or near the paving machine's asphalt or concrete dispensing and forming end. An installation matrix of bolt receiving eyes matching a preexisting matrix of bolt receiving eyes within the assembly's first mounting plate may then be formed within such vertical wall surface via drilling. Thereafter, the first mounting plate may be securely bolted to such paving machine's vertically oriented surface.

A typical asphalt or concrete paving machine may present multiple wall surfaces which are suitably utilized as a mounting site for the invention's vertical mounting plate. In contrast, such machines typically present few if any suitably used horizontal mounting surfaces. The instant invention's vertically oriented mounting plate component coordinates with and advantageously utilizes such machine's available vertical mounting surfaces.

Following a machine slide wall installation of the instant invention's mounting plate, an electric cable which serves the assembly's LED electric light may be extended along the boom arm and down the column to connect electrically with the paving machine's electric power system. In the preferred embodiment, at least the boom arm includes a hollow bore which functions as a power cord receiving and protecting conduit.

In operation during nighttime hours, the assembly's column may rotatably move clockwise or counterclockwise through the action of the swivel joint. Cantilevering turn handles mounted at the lower end of the vertical column are preferably provided to assist in manual rotation of the assembly. In response to rotation of the assembly's vertical column, the boom arm and the LED light attached to the arm's distal end advantageously moves orbitally to various desired lighting positions. Upon actuation of the electric light, crucially supervised and viewed areas of paving operations at and about the pavement working end of the paving machine are advantageously illuminated.

Accordingly, objects of the instant invention include the provision of a paving machine lighting assembly which incorporates structures as described above, and which arranges those structures in relation to each other in the manners described above for the achievement of and performance of beneficial functions as described above.

Other and further objects, benefits, and advantages of the instant inventions will become known to those skilled in the art upon review of the detailed description, which follows, and upon review of the appended drawings.

BRIEF DESCRIPTION OF DRAWINGS

FIG. 9 depicts a concrete paving machine including assembly mounting surfaces.

DETAILED DESCRIPTION OF A PREFERRED EMBODIMENT

Figure 1:
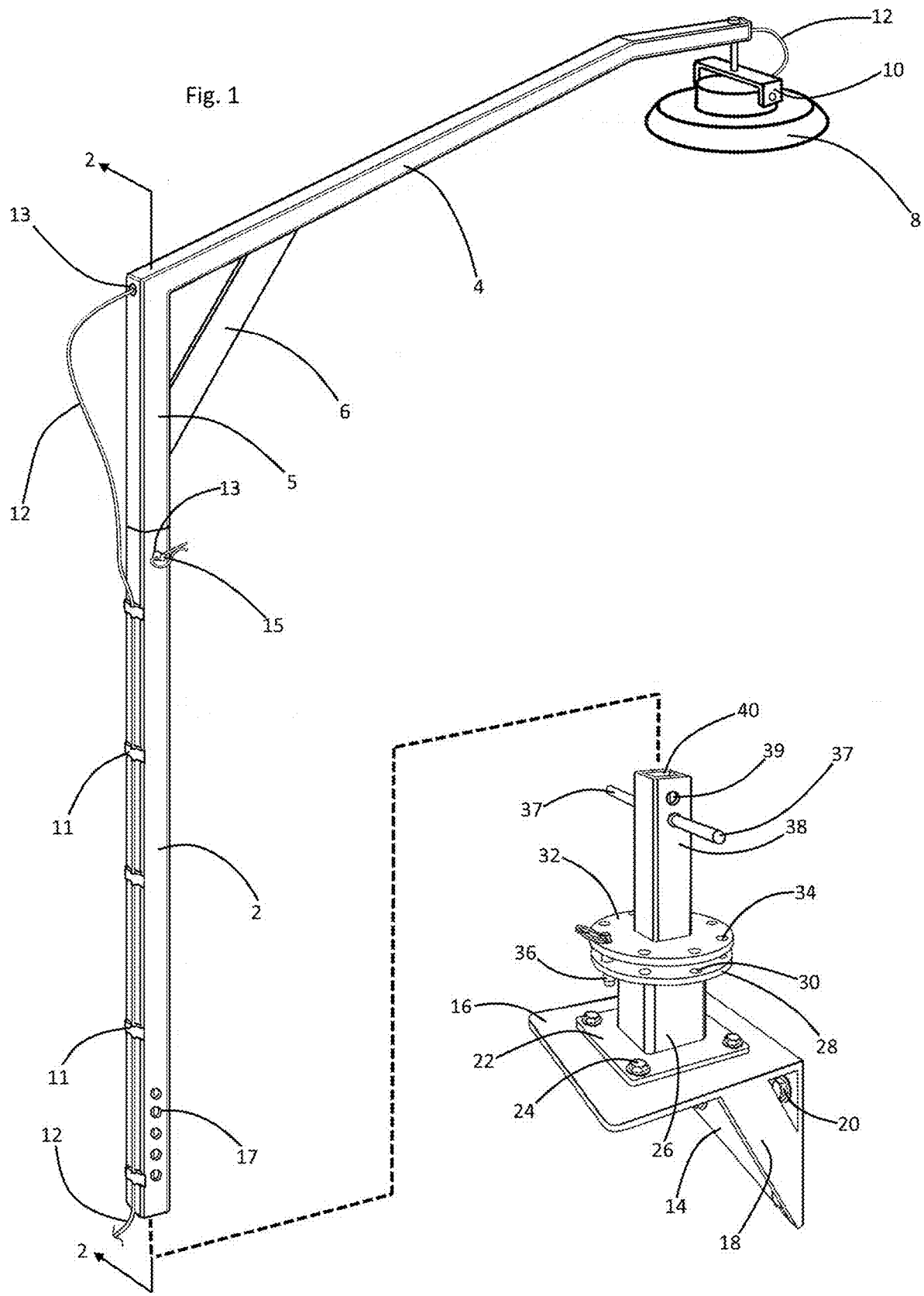
FIG. 1 is a perspective view of a preferred embodiment of the instant inventive paving machine lighting assembly, the view showing sub-assemblies which may be successively mounted upon a paving machine.

Referring now to the drawings, and in particular simultaneously to FIGS. 1-4, the instant inventive paving machine lighting assembly preferably comprises a steel mounting plate 14. In the preferred embodiment, such mounting plate 14 is substantially square, is vertically oriented, and has approximate 9"×9" dimensions.

A further structural component of the inventive assembly comprises a shelf 16 which is similarly preferably composed of plate steel. The shelf 16 is preferably fixedly attached to and cantilevers substantially horizontally from the upper end of the mounting plate 14. Gusset plates 18 and 19 triangulate between the shelf 16 and the mounting plate 14, such gusset plates rigidly supporting the shelf 16. In the preferred embodiment, the shelf 16 is apertured by a lower matrix of bolt receiving eyes (not depicted within views).

A vertical column component of the inventive assembly is fixedly attached to and extends upwardly from the shelf 16. In the preferred embodiment, the column component is segmented, the column's segments including at least an upper column segment 2 and a lower column segment 26. The upper end 5 of the upper segment 2 of the vertical column preferably incorporates a downwardly extending pin 7, such pin serving as a pin half of a telescoping pin-and-socket joint. Such pin 7 preferably presents a plurality of lock pin receiving eyes 9, which, upon selective alignments with eye 13, may receive a through passage of a lock pin 15.

A second mounting plate 22 is preferably fixedly welded to the lower end of the columns' lower column segment 26, the second mounting plate 22 being securely bolted to the upper surface of the shelf 26 by nut and bolt combination fasteners 24. The second mounting plate 22 is preferably apertured by an upper matrix of bolt receiving eyes (not within views). The upper and lower matrixes of bolt receiving eyes preferably mirror each other, and, upon vertical alignment, such eye matrixes may receive the nut and bolt fasteners 24.

A swivel joint which is referred to generally by reference to arrow 31 interconnects the column's upper and lower segments. In the preferred embodiment, the swivel joint 31 comprises an upper circular plate 32, a lower circular plate 28, and an interstitially positioned bearing plate 42. Bolt receiving eyes 33, 41, and 27 extend respectively through and open at the upper circular plate 32, the bearing plate 42, and the lower circular plate 28. Such eyes preferably align within the column's upper segment 2 to facilitate receipt of an axle bolt 44. A threaded nut 50 may engage such bolt 44, and upon tightening, the nut 50 compressively holds plates 32, 42, and 28 between provided washers 46 and 48. To facilitate wrench turning access to the nut 50 within the hollow bore 25 of the column's lower segment 26, the second mounting plate 22 preferably includes a centrally positioned aperture 21. In a suitable alternative embodiment, aperture 33 may be eliminated, and a helically threaded lug matching the screw threads of bolt 44 may extend downwardly from circular plate 32.

The bearing plate 42 component of the swivel joint 31 is suitably composed of high-density polyethylene plastic (HDPE plastic) which allows substantial torque to be applied to nut 50 while continuing to allow rotations and counter-rotations of the circular plates 28 and 32 with respect to each other. Screw torque induced tension imposed upon the axle bolt 44 advantageously drives the circular plates 32 and 28 toward each other and against bearing plate 42, thereby resisting wobbling or rocking of column's upper and lower segments with respect to each other. The HDPE composition of the bearing plate 42 simultaneously facilitates relatively friction free rotations of the plates 32 and 28 with respect to each other. The HDPE plastic composition of the bearing plate 42 also advantageously seals steel bearing surfaces of plates 32 and 28 against rust. Turn handles 37 whose inner ends are threadedly mounted within screw sockets 35 may be advantageously provided, such handles allowing an operator of the lighting assembly to easily and conveniently rotate the assembly about a vertical axis.

The upper and lower circular plates 32 and 28 preferably present upper and lower circumferential arrays of lock pin receiving eyes 34 and 30. The provision of both upper and lower circumferential arrays of lock pin receiving eyes is preferred because the presence of dual or upper and lower alignable arrays of eyes facilitates variability of the relative rotary positions of the plates 32 and 28, and additionally facilitates variability in positioning of a lock pin 36. Notwithstanding, a single circumferential array of eyes may be provided, such single array residing either at the upper or lower circular plate. Whichever circular plate presents the at least one circumferential array of lock pin receiving eyes, the other circular plate necessarily presents at least one alignable lock pin receiving eye.

Figure 2:
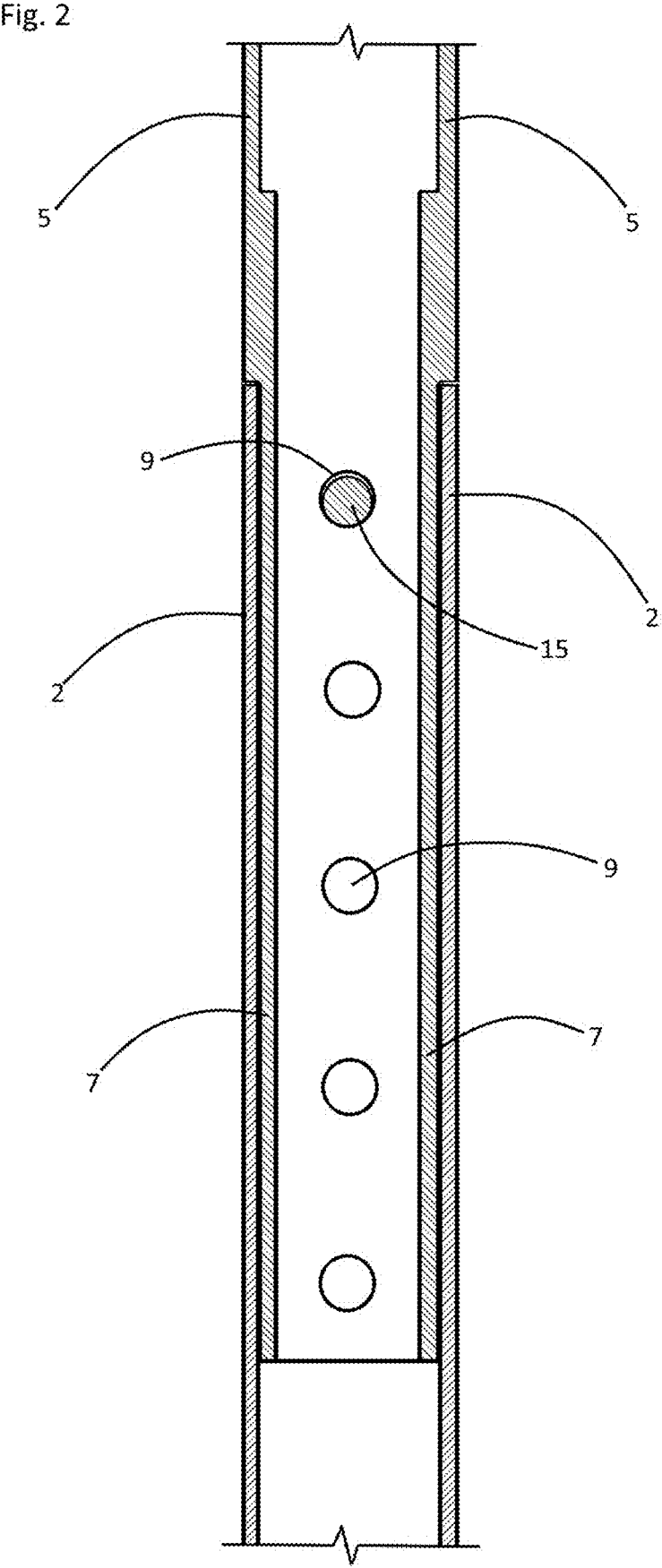
FIG. 2 is a partial sectional view, as indicated in FIG. 1.
Figure 3:
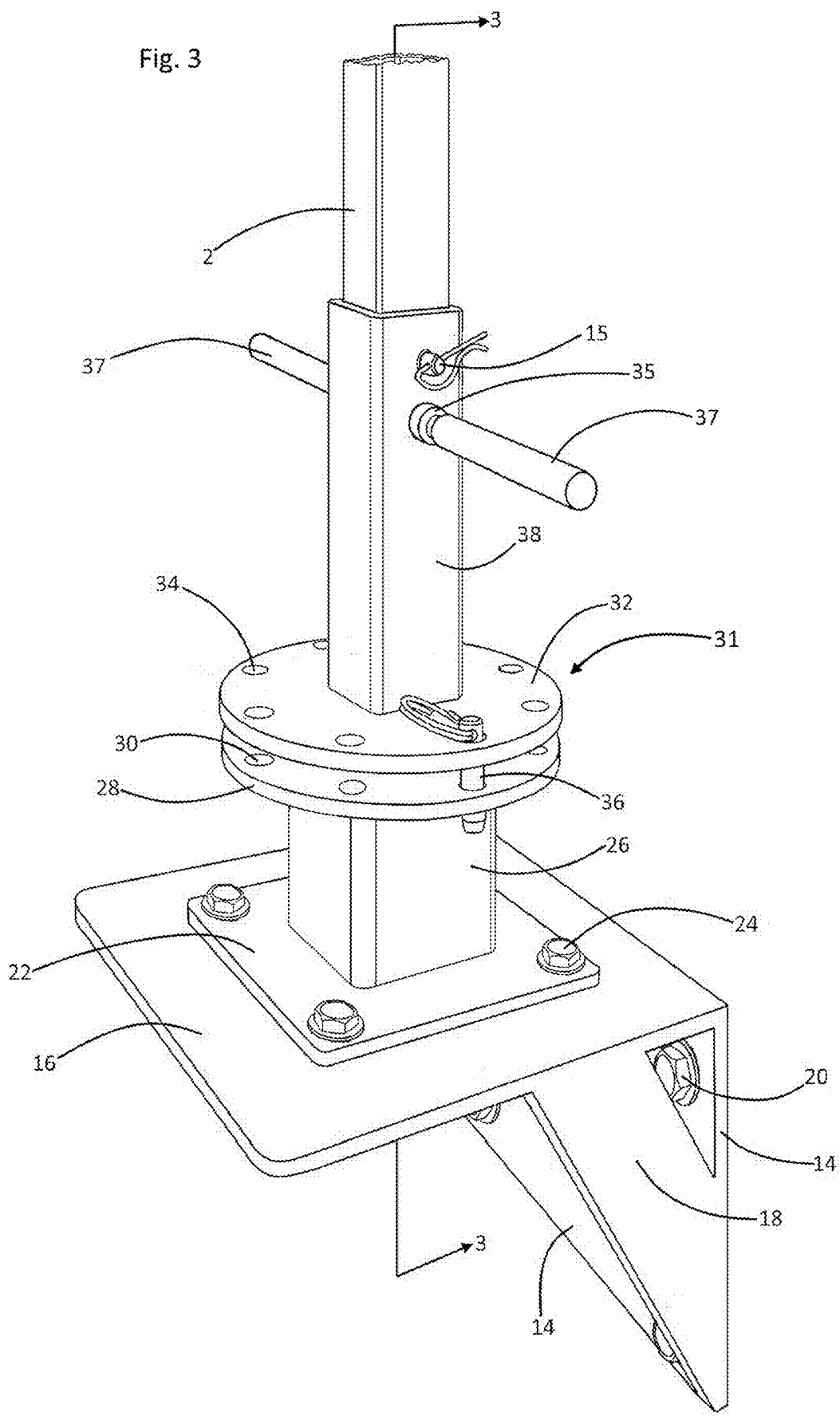
FIG. 3 is a magnified view of a portion of the structure depicted in FIG. 1.

As shown in FIG. 2, the lock pin 36 may extend through a pair of vertically aligned lock pin receiving eyes among eyes 30 and 34, effectively locking the upper and lower circular plates 32 and 28 against relative rotation with respect to each other. An operator's extension of such pin 36 through such vertically aligned eyes advantageously locks the boom arm 4 and light 8 at a selected position.

While the lower end of the column's upper segment 2 may be suitably directly welded to the upper surface of the upper circular plate 32, such upper plate 32 preferably presents a sleeve configured socket 38 having an upwardly opening hollow bore 40. Such hollow bore 40 may receive the lower end of the upper segment 2 to securely and releasably attach the column's upper segment 2 to the swivel joint's upper circular plate 32. In a preferred embodiment, the lower end of the column's upper segment presents a series of vertical extension adjustment eyes 23. Upon alignment of eyes 39 within socket 38 with a selected one of such eyes 17, an operator may further selectively adjust the vertical extension and height of the assembly's column.

The assembly's cantilevering boom arm 4 has its proximal end fixedly attached to or formed wholly with the upper end of the column's upper segment 2, the adjustable pin and socket connection 5,7,9,13,15 being preferred. The proximal end of the boom arm component 4 is supported by a gusset plate 6, and the distal end of the boom arm component 4 supports an electric light 8, preferably a light emitting diode light, which is mounted by means of a pivoting swivel bracket 10. An electric power cord 12 extends from the light 8, such cord preferably entering a hollow bore of the boom arm 4 at such arm's extreme distal end. The power cord 12 preferably extends along the complete interior of the boom arm 4, and emerges at cable port 13 at the arm's proximal end. The power cord then extends downwardly along the column, and is releasably fastened thereto by a plurality of "Velcro" or flexible hook and loop pad fasteners 11. Upon disassembly of the boom arm 4 from the column 2, the power cord 12 may conveniently remain with the boom arm and light via releases of such fasteners 11.

Figure 5:
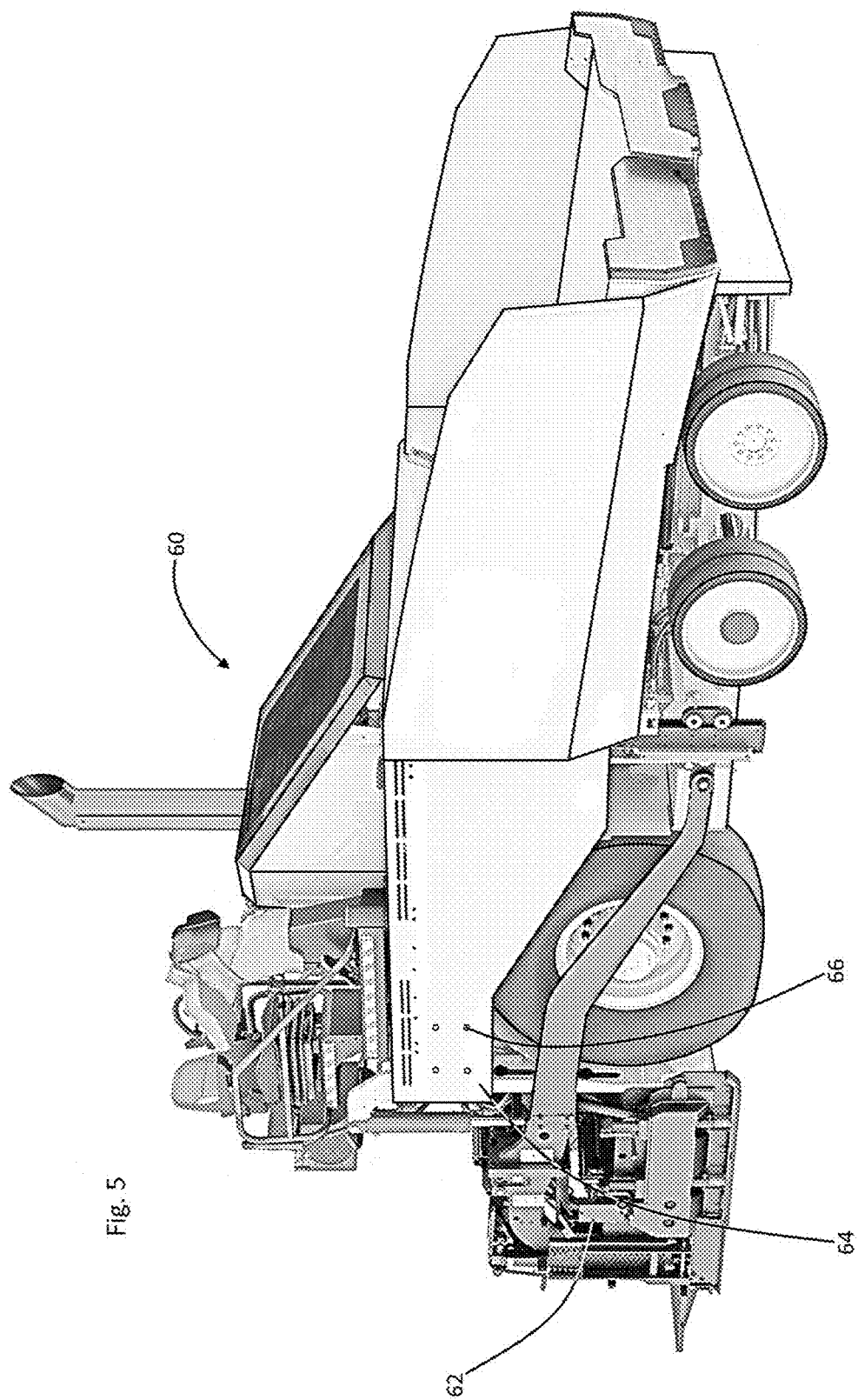
FIG. 5 is an asphalt paving machine which presents a vertical mounting surface component of the inventive assembly.

Referring further simultaneously to FIG. 5, an asphalt paving machine 60 has a forward asphalt hopper, and has a rearward asphalt dispensing and asphalt pavement forming end 62. Such roadway paving machines commonly present multiple substantially vertical surfaces such as wall 64 which may be suitably utilized as a mounting surface for support of the instant inventive lighting assembly. Upon identifying such substantially vertical surface 64 at the road paving end of such machine 60, an operator or installer of the instant inventive assembly may drill a matrix of bolt receiving eyes 66 within such wall surface 64, such matrix of bolt receiving eyes 66 preferably closely matching the bolt receiving eyes within the first mounting plate 14.

Figure 6:
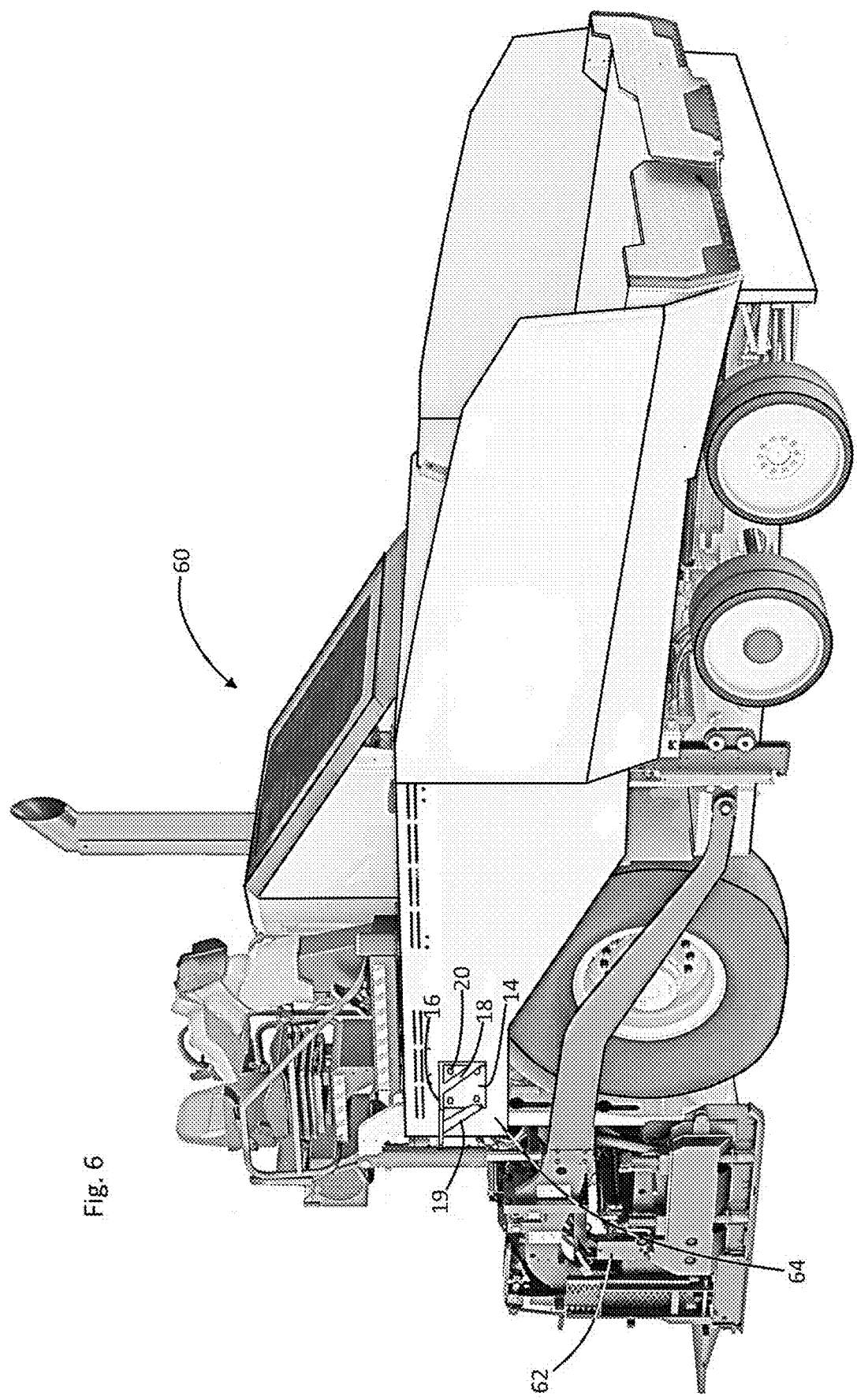
FIG. 6 re-depicts the structure of FIG. 5, the view of FIG. 6 showing an installation of shelf and mounting plate components.

Referring further simultaneously to FIG. 6, the base weldment components of the assembly including mounting plate 14, shelf 16, and gusset plates 18 and 19 may be placed against the vertical wall surface 64 so that the bolt receiving eyes of the mounting plate 14 align with bolt receiving eyes 66. Thereafter, bolts 20 may be extended therethrough. Upon engagements with inwardly underlying nuts, such bolts may be tightened. Upon insertions of and screw tightening of the bolts 20, the lower weldment 14,16,18,19 is firmly mounted and secured upon the paving machine's vertical surface 64.

Figure 7:
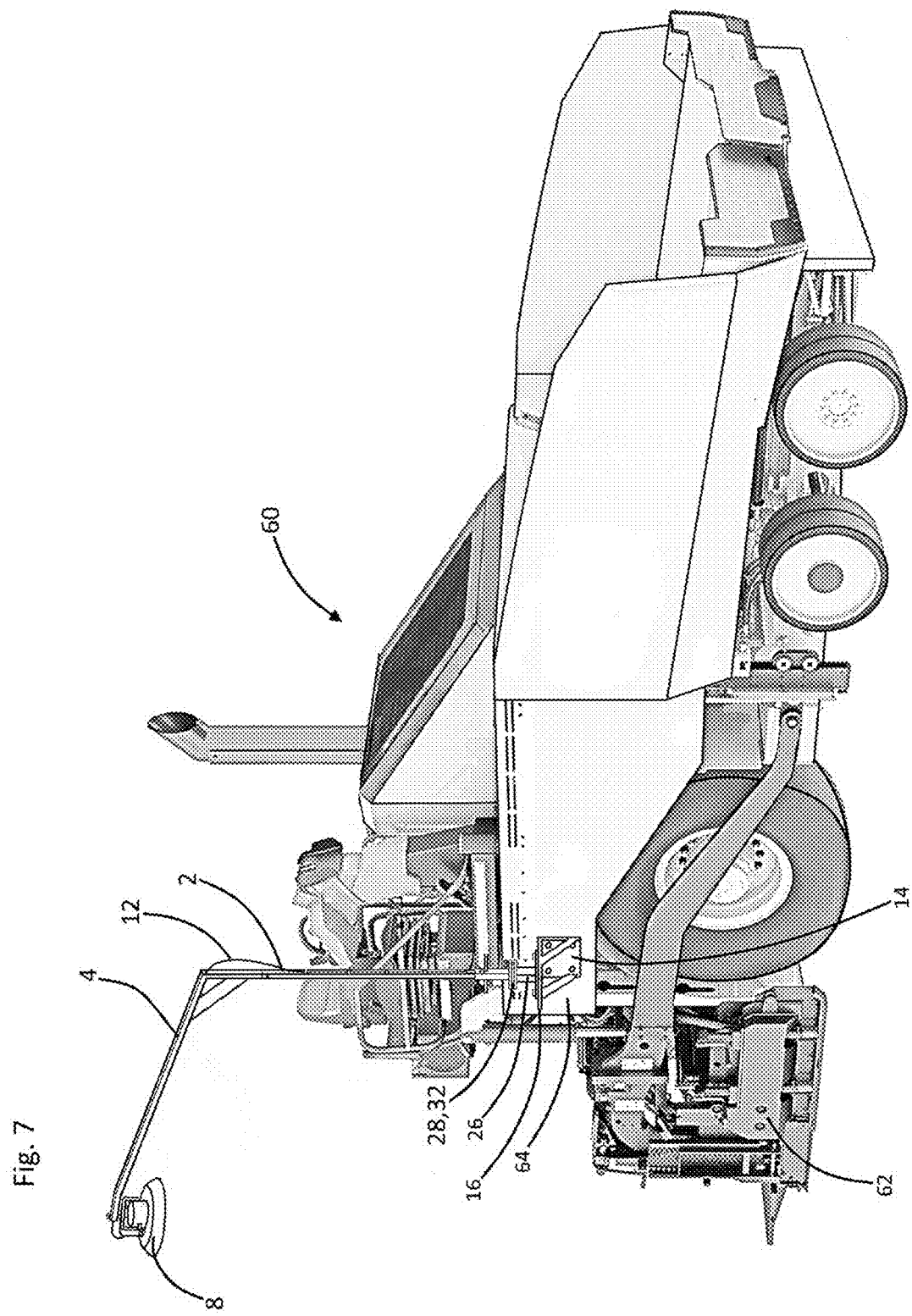
FIG. 7 is a perspective view of the completed inventive assembly.

Thereafter, referring further to FIG. 7, the second mounting plate 22 may be placed upon the upper surface of the shelf 16 so that such plate's bolt receiving eyes vertically align with the underlying bolt receiving eyes (not depicted within views) of the shelf 16. Thereafter, nut and bolt fasteners 24 may be extended through such aligned eyes, thereby securely mounting the lower segment 26 of the assembly's column to the shelf 16.

Thereafter, the upper segment 2 of the column may be downwardly slidably engaged with the upper opening of the sleeve configured socket 38. Upon such engagement, the lower end of the column segment 2 is securely slidably received within the hollow bore 40 of the socket 38. Such socket attachment also advantageously facilitates easy disassembly. The electric cable 12 extending from electric light 8 may be electrically connected with the machine's electrical system.

Figure 4:
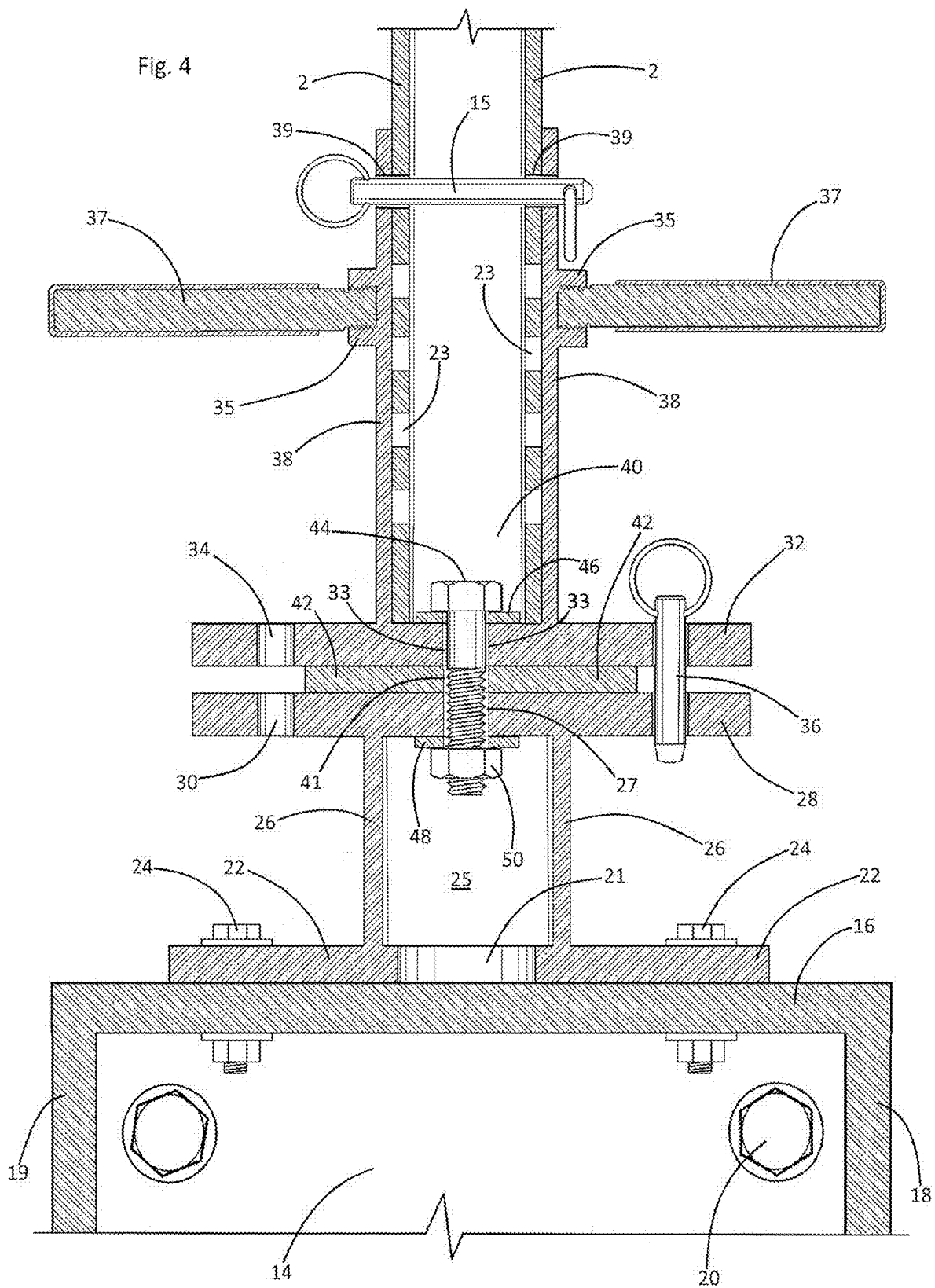
FIG. 4 is a sectional view as indicated in FIG. 3.

Referring to the assembled configuration of FIG. 4, lock pin 36 may be temporarily upwardly removed by an operator to allow the upper components of the lighting assembly to freely rotate with respect to the assembly's lower components. Such rotary motion advantageously allows the boom arm 4 and the distally mounted electric light 8 to be selectively orbitally moved to positions at the side of the paving machine 60 or forwardly from said machine.

Figure 8:
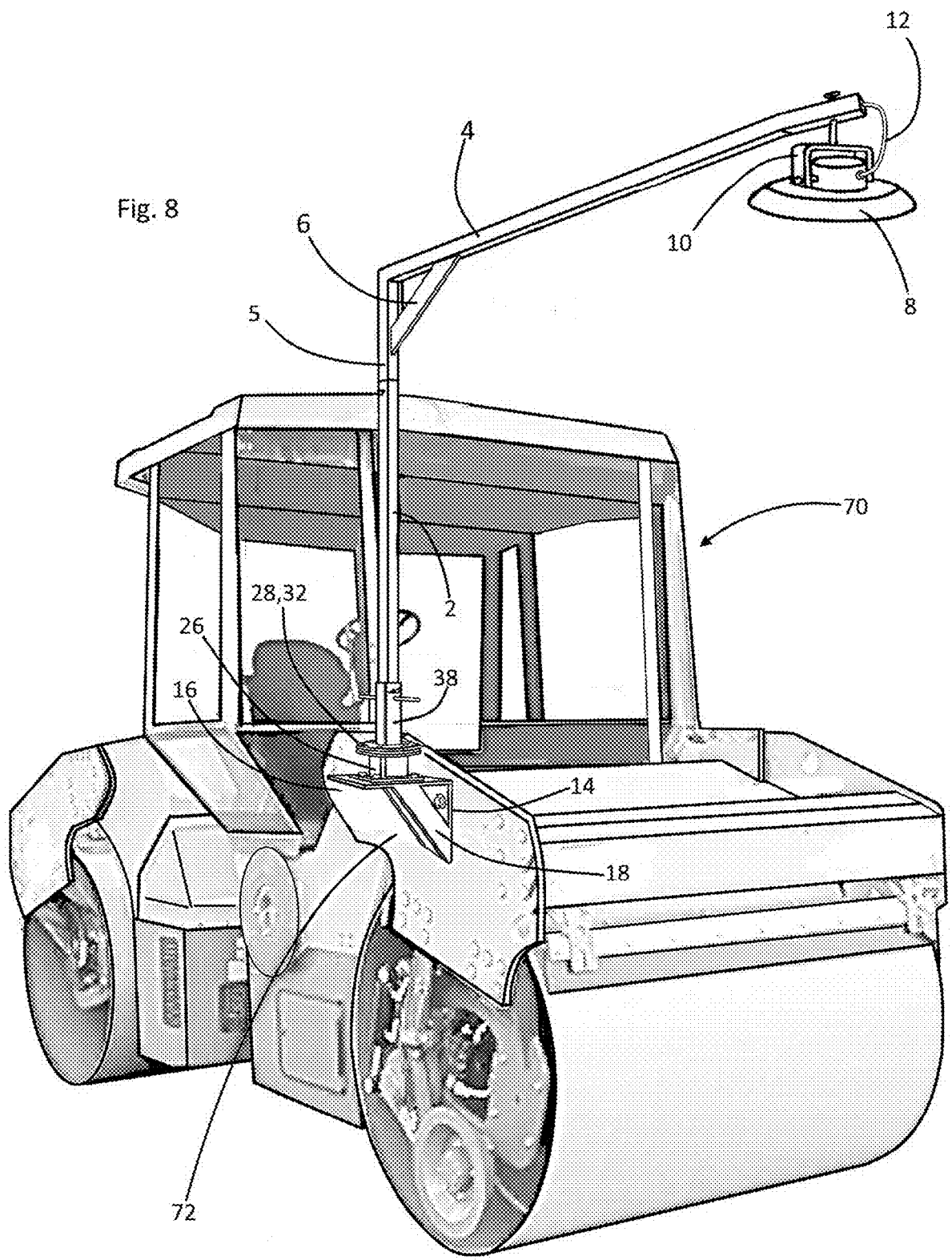
FIG. 8 depicts a roller compactor paving machine having the instant inventive assembly installed.

FIG. 8 shows the instant inventive assembly alternatively mounted at the forward pavement working and forming end of a mobile roller compactor machine 70, such machine presenting a suitable vertical mounting surface 72.

FIG. 9 further alternatively shows a concrete slab forming end of a concrete paving machine 80. The machine similarly presents multiple suitable vertical mounting surfaces 82 and/or 86 upon which fastener receiving eyes 84 and 88 may be drilled. Multiple lighting assemblies of the type depicted in FIGS. 1-4 may be suitably provided and mounted at multiple vertical locations upon a single concrete or asphalt paving machine.

While the principles of the invention have been made clear in the above illustrative embodiment, those skilled in the art may make modifications to the structure, arrangement, portions, components, and method steps of the invention without departing from those principles. Accordingly, it is intended that the description and drawings be interpreted as illustrative and not in the limiting sense, and that the invention be given a scope commensurate with the appended claims.

The invention claimed is:

1. A paving machine lighting assembly comprising:
   a. A first mounting plate;
   b. A shelf fixedly attached to and cantilevering from the first mounting plate;
   c. A column fixedly attached to and extending upwardly from the shelf, the column comprising an upper segment and a lower segment;
   d. A swivel joint interconnecting the column's upper and lower segments;
   e. A boom arm having proximal and distal ends, the boom arm's proximal end being fixedly attached to an upper end of the column; and
   f. An electric light fixedly attached to the boom arm's distal end.

2. The paving machine lighting assembly of claim 1, comprising a vertically oriented surface situated at a pavement forming end of the paving machine, and comprising mounting means interconnecting the first mounting plate and said vertically oriented surface.

3. The paving machine lighting assembly of claim 2, wherein the mounting means comprise bolt and bolt receiving eye combinations.

4. The paving machine lighting assembly of claim 3, further comprising first gusset plates extending from the shelf to the first mounting plate.

5. The paving machine lighting assembly of claim 4, further comprising a second gusset plate extending from the boom arm to the column.

6. The paving machine lighting assembly of claim 3, further comprising a second mounting plate fixedly attached to a lower end of the column's lower segment.

7. The paving machine lighting assembly of claim 6, wherein the swivel joint comprises an upper circular plate, a lower circular plate, and a bearing plate between the upper and lower circular plates.

8. The paving machine lighting assembly of claim 7, wherein the column's lower segment has an upper end rigidly attached to the lower circular plate, and wherein said segment has a lower end rigidly attached to the second mounting plate.

9. The paving machine lighting assembly of claim 8, further comprising an upwardly opening socket fixedly attached to the upper circular plate, the upwardly opening socket slidably receiving a lower end of the column's upper segment.

10. The paving machine lighting assembly of claim 7, wherein swivel joint comprises a circumferential array of lock pin receiving eyes, the circumferential array of lock pin receiving eyes opening at either the upper circular plate or the lower circular plate, and comprising at least a first rotatably alignable eye which opens at one of the circular plates, the at least first rotatably alignable eye overlying or underlying the circumferential array of lock pin receiving eyes.

11. The paving machine lighting assembly of claim 10, further comprising a second circumferential array of lock pin receiving eyes, the second circumferential array of lock pin receiving eyes comprising the at least first rotatably alignable eye.

12. The paving machine lighting assembly of claim 7, further comprising a plurality of axle bolt passage eyes, each eye among the plurality of axle bolt passage eyes opening at one of the plates along the bearing plate and upper and lower circular plates.

13. The paving machine lighting assembly of claim 12, wherein the column's lower segment has a hollow bore, and further comprising a bolt access eye, said eye opening at the second mounting plate and communicating with said hollow bore.

14. The paving machine lighting assembly of claim 1, wherein the electric light comprises an LED light.

15. The paving machine lighting assembly of claim 14, further comprising a power cable connected electrically with the electric light.

16. The paving machine lighting assembly of claim 15, wherein the boom arm comprises a hollow bore, and wherein the said power cable extends along and is housed within said hollow bore.

17. The paving machine lighting assembly of claim 11, further comprising at least a first turn handle fixedly attached to the vertical column.

18. The paving machine lighting assembly of claim 17 wherein the at least first turn handle has an inner end positioned at the vertical column's upwardly opening socket.

19. The paving machine lighting assembly of claim 11 further comprising at least a first pin, eye, and socket joint, said joint adjustably interconnecting abutting column segments.

20. The paving machine lighting assembly of claim 11 further comprising a plurality of flexible hook pad and loop pad fasteners, said fasteners releasably connecting the power cable to the vertical column.

* * * * *